(12) United States Patent
Kapoor et al.

(10) Patent No.: US 7,454,459 B1
(45) Date of Patent: Nov. 18, 2008

(54) METHOD AND APPARATUS FOR IMPLEMENTING A REAL-TIME EVENT MANAGEMENT PLATFORM

(75) Inventors: Sanjay Kapoor, Menlo Park, CA (US); Andrew Toy, Menlo Park, CA (US)

(73) Assignee: Jarna, Inc., Menlo Park, CA (US)

( * ) Notice: Subject to any disclaimer, the term of this patent is extended or adjusted under 35 U.S.C. 154(b) by 584 days.

(21) Appl. No.: 10/236,003

(22) Filed: Sep. 4, 2002

Related U.S. Application Data

(60) Provisional application No. 60/317,372, filed on Sep. 4, 2001.

(51) Int. Cl.
*G06F 15/16* (2006.01)
(52) U.S. Cl. .................. 709/203; 709/202; 709/206; 709/207; 709/245; 707/203
(58) Field of Classification Search ............. 709/202, 709/203, 206, 207, 245; 707/203
See application file for complete search history.

(56) References Cited

U.S. PATENT DOCUMENTS 5,850,517 A * 12/1998 Verkler et al. ............ 709/202
6,370,566 B2 * 4/2002 Discolo et al. ............ 709/206
6,505,200 B1 * 1/2003 Ims et al. ..................... 707/8
6,721,779 B1 * 4/2004 Maffeis ..................... 709/202
6,779,019 B1 * 8/2004 Mousseau et al. .......... 709/206
6,950,875 B1 * 9/2005 Slaughter et al. ........... 709/230

* cited by examiner

*Primary Examiner*—Nathan J. Flynn
*Assistant Examiner*—Kyung H Shin
(74) *Attorney, Agent, or Firm*—Oblon, Spivak, McClelland, Maier & Neustadt, P.C.

(57) ABSTRACT

A method and apparatus for implementing a real-time enterprise event management system is disclosed. The enterprise event management (EEM) system couples together various "event aware" computing resources that publish and subscribe to "events" that provide information about the state computing resources. All of the events are represented as eXtensible Mark-up Language (XML) documents. Chains of related events are known as "event streams". In the real-time event management platform, the event streams are available to all other event-aware computing resources operating in the shared event driven environment. The three main components are a real-time messaging system or handing event messages, a rules engine for allowing specific event message handing rules to be created, and a enterprise directory schema for providing a comprehensive directory of all the available resources and the means in which the resources may be accessed.

19 Claims, 9 Drawing Sheets

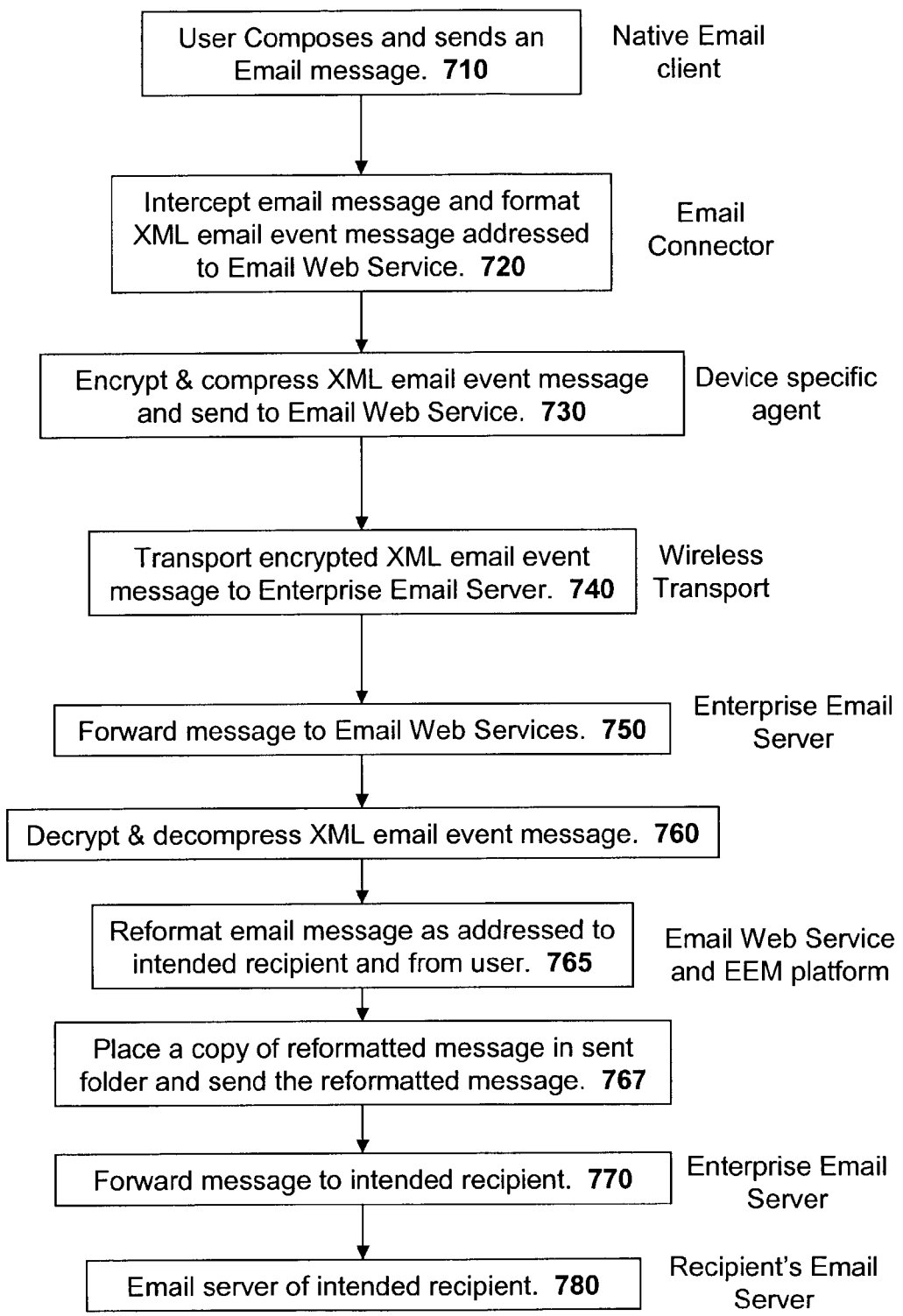

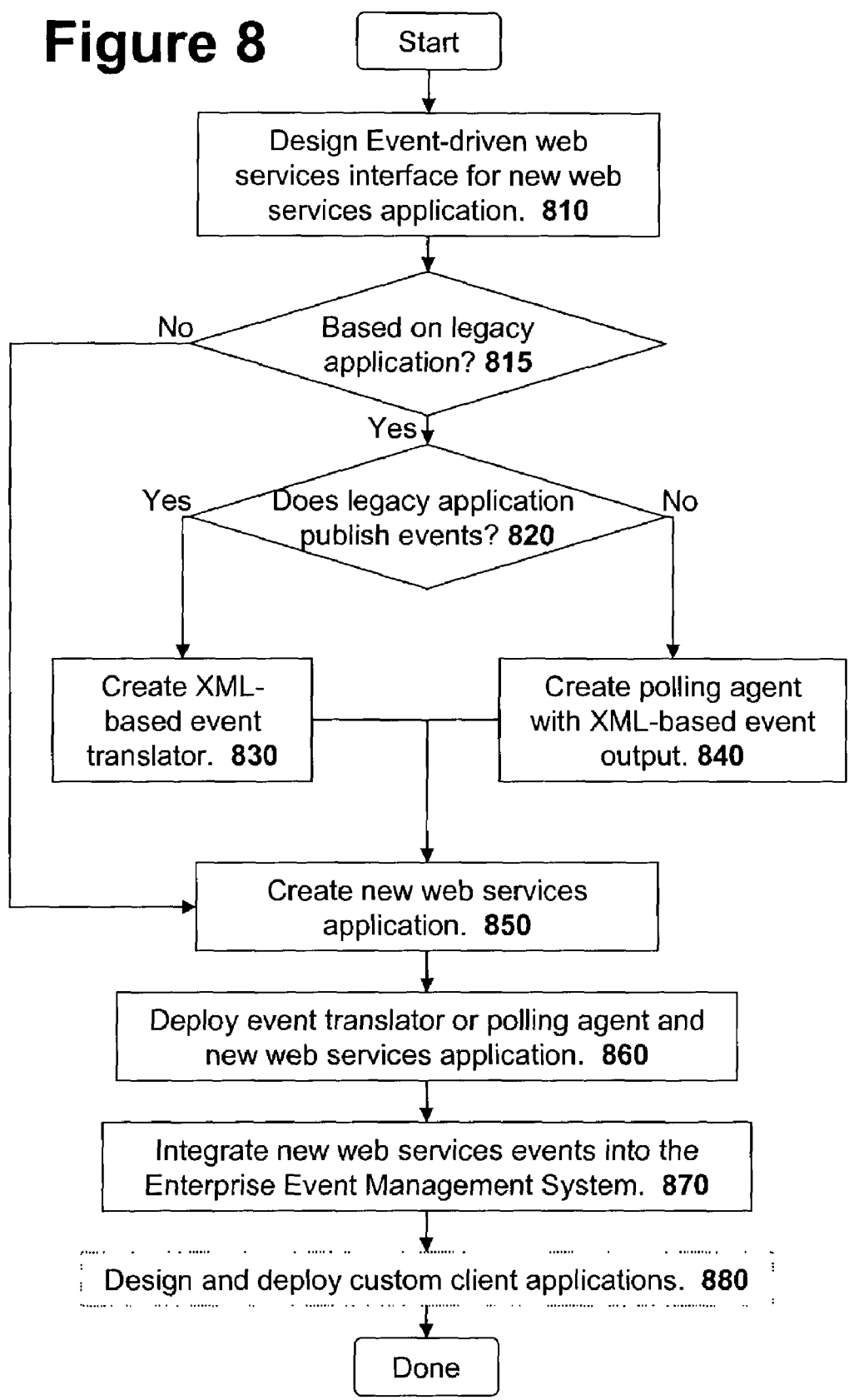

METHOD AND APPARATUS FOR IMPLEMENTING A REAL-TIME EVENT MANAGEMENT PLATFORM

RELATED APPLICATIONS

The present U.S. patent application claims priority to the U.S. provisional patent application entitled "Method and Apparatus for Implementing a Real-Time Event Management Platform", filed on Sep. 4, 2001 and having Ser. No. 60/317,372.

FIELD OF THE INVENTION

The present invention relates to the field of enterprise software. In particular the present invention discloses a real-time event management platform that can be used to join together many different enterprise information systems and extend the enterprise information system to mobile devices in a secure manner.

BACKGROUND OF THE INVENTION

As enterprises evolve into increasingly distributed organizations they face the increasingly difficult problem of managing numerous distributed data stores, facilitating distributed workgroups and supporting the proliferation of devices within the corporate environment. The solution is a real-time, collaborative messaging fabric that is able to intelligently manage these distributed resources, enabling enterprises to streamline processes and communication.

Presently, the majority of enterprise applications are designed without true real-time, workforce collaboration in mind. Although many vendors claim that their solutions are designed to aid real-time collaboration, these applications often merely provide a shared data store and rarely allow users to work together in a truly real-time integrated manner.

Even when these needs are met, the scope of the possible collaboration is normally restricted to a single application that understands how to communicate with users using the same program. Because of this limited view, these applications are difficult to extend to a distributed enterprise environment. This is especially true of a large enterprise that runs many different and sometime redundant information services due to different entities that have been joined due to mergers and acquisitions. Thus, it would be desirable to have a real-time system that integrates all the computing resources in an enterprise.

BRIEF DESCRIPTION OF THE DRAWINGS

The objects, features, and advantages of the present invention will be apparent to one skilled in the art, in view of the following detailed description in which:

FIG. 7 illustrates a flow diagram that describes how an email message may be securely sent from an EEM mobile client device through the email web services application to an outside user using the EEM platform.

FIG. 8 illustrates a flow diagram that describes the steps of implementing a new web service for the EEM platform.

DETAILED DESCRIPTION OF THE PREFERRED EMBODIMENT

A method and apparatus for implementing a real-time event management platform is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the well-known TCP/IP data communication protocols. However, the same techniques can easily be applied to other types of data communication protocols.

Real-Time Enterprise Event Management System Overview

To solve difficult enterprise information management problems, the present invention introduces a distributed event-driven system known as an "enterprise event management" (EEM) system. The enterprise event management (EEM) system is created by uniting many different enterprise-computing resources around a real-time event management platform in order to create an integrated real-time event management system.

The enterprise event management (EEM) system requires that individual computing resources (such as groupware servers, databases, directories, etc.) expose their inner workings to the real-time event management platform and be transformed into "event aware" data sources. The various computing resources then publish and subscribe to "events" to the real-time event management platform such that the published events provide information about the state computing resources. In a preferred embodiment, all of the events are represented as eXtensible Mark-up Language (XML) documents. Chains of related events are known as "event streams". In the real-time event management platform, the event streams are available to all other event-aware computing resources operating in the shared event driven environment.

In addition to event streams, computing resources integrated with the real-time event management platform are also capable of sending individual messages to other computing resources in the enterprise environment. The real-time event management platform intelligently and reliably delivers these messages to the proper destinations. The real-time event management platform uses different transport methods to communicate with the various computing resources as appropriate. The wealth of real-time message and event data enables computing resources to collaborate more rapidly and more intelligently than such computing resources could individually. A computing resource integrated into the real-time event management system is thus defined to be an application that is capable of receiving enterprise events and messages from the real-time event management platform and using these events and messages to be a more efficient problem-solving tool.

Figure 1:
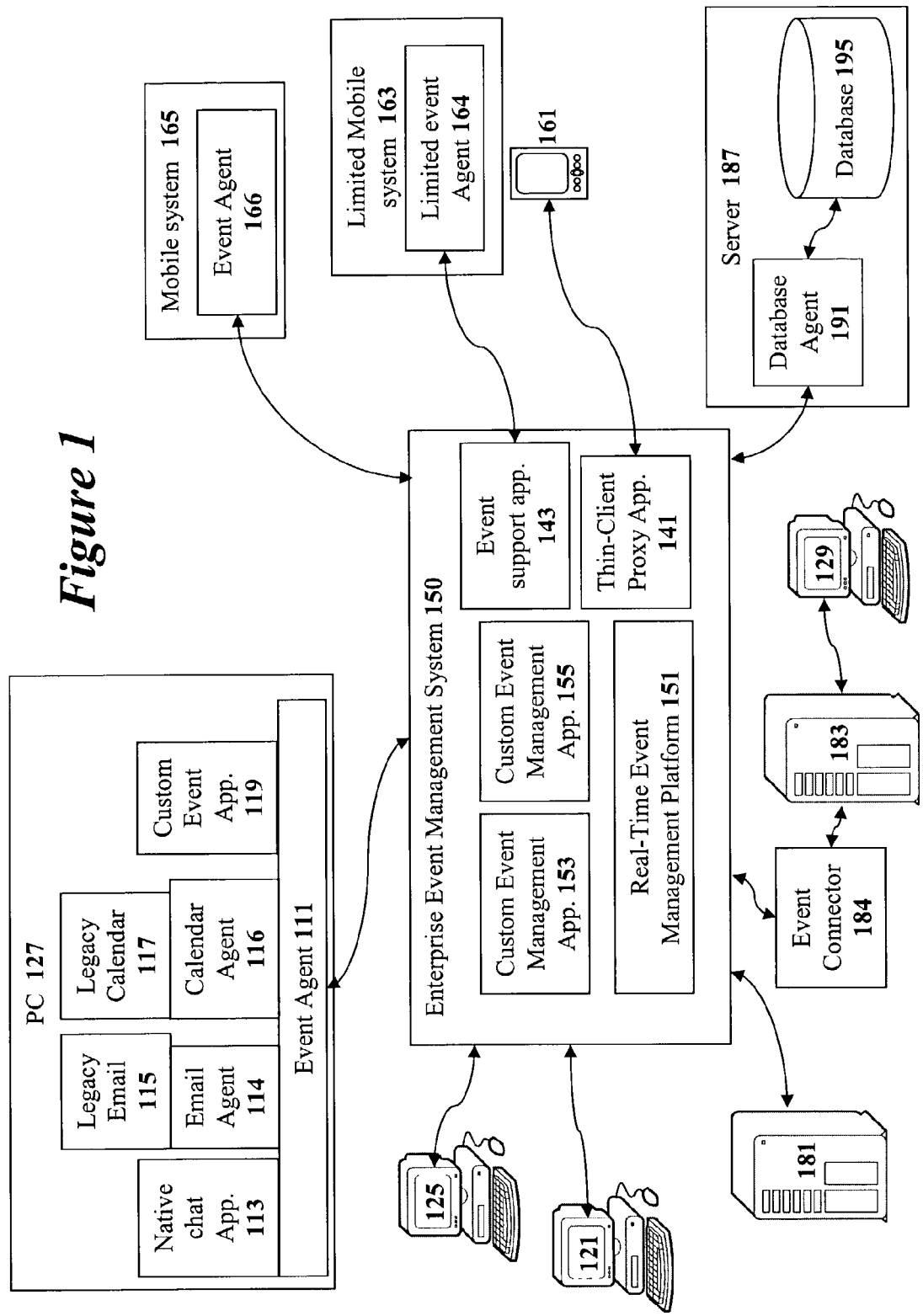
FIG. 1 illustrates a block diagram of one embodiment of a real-time event management system implemented within an enterprise.

FIG. 1 illustrates a high-level conceptual block diagram of one embodiment of a real-time enterprise event management system 150 implemented within an enterprise environment. The real-time enterprise event management system 150 of the present invention is designed to link together personal computers (121, 123, and 129), enterprise applications on server systems (181, 183, and 187), mobile client devices (161 and 163), and any other computing resource used by an enterprise with a real-time event-driven management platform 151. The real-time event management platform 151 will allow the various different computing resources to be used in a coordinated manner in real-time.

The system of the present invention unites the various different within an enterprise by adding a layer of software as necessary to enable these computing resources to communicate with the real-time event management system 150. Legacy resources may be integrated with a layer of software that makes such computing resources "event aware." Such a layer of software may be referred to as "event agent" or an "event connector" since the software layer acts as an agent to handle events for the legacy resource. The various event agent programs used to couple different computing resources to the real-time event management system 150 will vary depending on the capabilities of the particular computing resource. Each event agent program is designed to provide the best use of its associated computing resource.

Server Systems

Server systems may be coupled to the enterprise event management system 150 directly or indirectly through a connector program. For example, server system 181 is connected directly to the enterprise event management system 150. However, server systems 187 and 183 are indirectly coupled to the enterprise event management system 150.

FIG. 1 illustrates legacy database 195 on server system 187 coupled to the real-time event management system 150 using a database event agent 191 that is real-time event management enabled. Specifically, the database event agent 191 is able to send and receive events and messages in real-time in order to communicate with other entities of the real-time event management system 150. The database event agent 191 accesses information out of the legacy database 195 in order to fulfill requests in events or messages from other event aware computing resources.

Similarly, server system 183 uses an event connector 184 to connect server system 183 to the real-time event management system 150. If server system 183 has an event-driven application programming interface (API), then the event connector 184 may just be a bidirectional translator that translates between the event format of the real-time event management system 150 and the event format of server system 183. If the server system 183 does not support an event-driven API, then event connector 184 may periodically poll server system 183 to learn about any changes and then generate events from any changes detected. Event aware connectors have been created for Microsoft Exchange Servers, Lotus Notes Servers, Novell GroupWise servers, IMAP-compliant email servers, LDAP compliant Directory servers, Steltor CorporateTime servers, and iCAL compliant calendar servers.

Personal Computer Systems

Personal computer systems may also be coupled directly or indirectly to the enterprise event management system 150. FIG. 1 illustrates a personal computer system 127 coupled directly to the enterprise event management system 150 and personal computer system 129 coupled indirectly to the enterprise event management system 150

To be coupled directly to the enterprise event management system 150, the personal computer system must be made event aware using an event agent. The event agent in a personal computer system may act as a centralized event distributor for other programs that may use events. Specifically, personal computer 127 illustrated in FIG. 1 has an event agent 111 that distributes events to various event aware applications on the personal computer system 127.

The event aware applications on the person computer system 127 may be native event applications or legacy applications that use another event aware agent as an intermediary. For example, in personal computer 127 of FIG. 1 a native chat application 113 communicates directly with event agent 111 to send and receive events. Legacy email program 115 communicates with the event agent 111 though an email agent 114 that translates the communication between the legacy email application and the event agent 111. Similarly, legacy calendar program 117 communicates with the event agent 111 though a calendar agent 116 that translates the communication between the legacy calendar application 117 and the event agent 111. Once event 111 agent has been installed on a personal computer, the personal computer system may run custom event applications such as custom event application 119.

As previously set forth, a personal computer does not have to have an event agent to participate in the real-time event management system 150. The personal computer may instead participate indirectly with the real-time event management system 150. For example, personal computer 129 may work with server system 183 using a native client application for server system 183. However, the changes made to server system 183 by personal computer 129 using the native client application will be reflected in the real-time event management system 150 due to event connector 184 publishing events caused by the changes.

Mobile Computer Systems

One of the key features of the real-time event management system 150 is the ability to allow many different types of mobile computer systems to be integrated into the real-time event management system 150. By creating a platform-neutral standards-based real-time event management system, the present invention allows any new mobile computer system to be quickly integrated into the event management system. Thus, the real-time event management system 150 provides Information Technology (IT) managers with a choice among the existing mobile computer systems and the ability to adapt to new mobile devices that are later released. The degree of integration of a particular mobile computer system will depend upon the resources of the mobile computer system.

Some very limited computing resources cannot be sufficiently modified to become event aware. For example, a cellular telephone system with a very primitive browser application cannot be made event aware. With such limited systems, a proxy application can be used to integrate such "thin-client" systems into the real-time event management system 150. For example, FIG. 1 illustrates a thin-client handheld system 161 that cannot be significantly modified. To support such a thin-client device, a thin-client proxy application 141 is created to integrate the thin-client handheld system 161 into the real-time event management system 150.

The task of integrating limited mobile systems with the real-time event management system 150 may be split into more than one application running on different systems. This technique works well for mobile systems with limited abilities. For example, limited mobile computer system 163 may execute a limited event agent 164 that performs certain event operations. However, due to resource limitations, limited event agent 164 cannot handle a full range of event messages. To compensate for the limitations of limited event agent 164, limited event agent 164 is supported by event application 143.

The user experience will be provided to mobile computer systems with a good programming environment. In such systems, a full event agent is handles event messages for the mobile computer system. FIG. 1 illustrates mobile computer system 165 containing a full event agent 166. Like the event agent 111 in personal computer 127, even agent 166 can send and receive event messages. Similarly, event agent 166 distributes event messages to event aware applications on the mobile computer system or event connectors that communicate with native applications through their native APIs.

Event Applications

In the traditional approach to solving enterprise Information Technology (IT) problems, a single application is assigned to work on specific problems and processes. The event management system of the present invention provides an alternative approach to finding solutions to these problems by having developers recognize that processes are really part of the greater enterprise framework. In the system of the present invention, the solution to a problem may be found by distributing the problem over a number of different applications and resources within the system. From the perspective of the individual application, it is still trying to achieve its own goal, however the individual application is free to collaborate with other applications and resources in the overall system. Thus, by uniting all the computing resources of an enterprise together with a real-time event management system, new event management applications can be created.

The system of the present invention allows an entity to create any number of event management applications. Each event management application communicates using the message passing features of the real-time event management system 150. FIG. 1 illustrates custom event management applications 153 and 155. Custom event management applications 153 and 155 can provide new applications and services that were previously not possible since custom event management applications 153 and 155 have access to every other computer resource connected in the real-time event management system 150.

At the core of the real-time event management system 150 is the real-time event management platform 152. All of the different enterprise computing resources communicate directly or indirectly with the real-time event management platform 152 in order to unite the various computing resources.

Real-Time Event Management Platform

Figure 2:
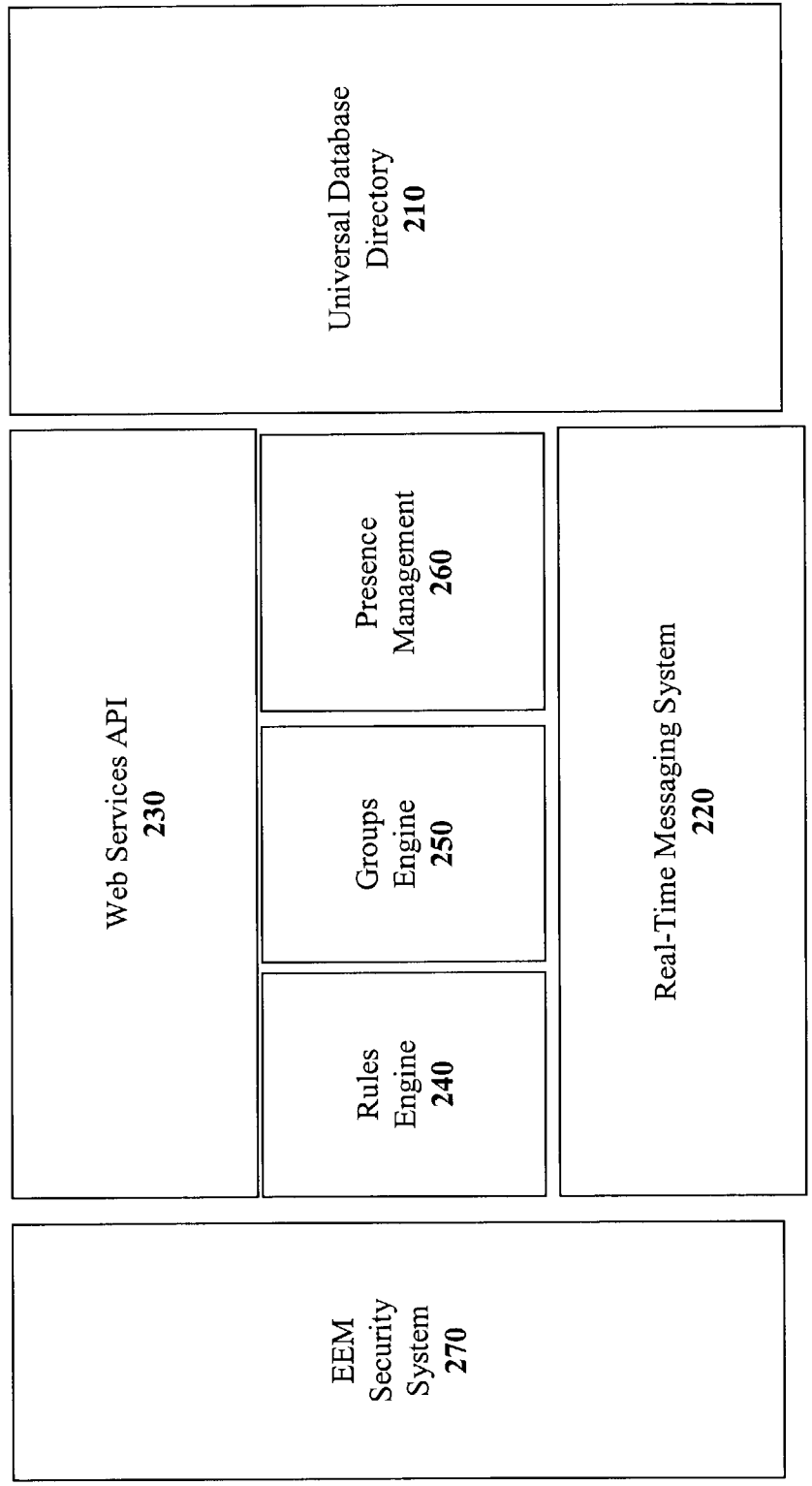
FIG. 2 illustrates a block diagram of one embodiment of the real-time event management platform of the present invention.

FIG. 2 illustrates a block diagram of one embodiment of the real-time event management platform of the present invention. In the embodiment of FIG. 2, there are seven main components of the real-time event management platform of the present invention: a Universal Database Directory (UDBD) 210, a real-time messaging system 220, an EEM application programming interface (API) 230, a rules engine 240, a groups engine 250, a presence management system 260, and security system 270. The three main components are the real-time messaging system 220 for handing event messages, the rules engine 240 for allowing specific event message handing rules to be created, and the enterprise directory schema 210 for providing comprehensive directory of all the available computing resources and the corresponding means in which those computing resources may be accessed. All of the various components of the Enterprise Event Management platform will be examined in detail.

Enterprise Directory

To allow distributed computing resources to communicate effectively, the various computing resources must have a consistent shared context such that the different computing resources can identify and address each other. With a universally consistent shared context, the various computing resources can generate events that are delivered to the proper interested parties.

To implement universally consistent shared context, real-time event management platform provides the Universal Database Directory (UDBD) 210—an abstracted data model that is common to all EEM applications running in the corporate environment. EEM applications can use the UDBD 210 as a shared context in which the EEM applications know all resources of interest can be found. This shared data store can also be used by EEM applications for storing application-specific data that needs to be accessed regardless of location or device. In addition, the UDBD 210 can be used in an inter-application context by providing a central repository of data that is shared by several applications and users. This central store is one of the key benefits of the EEM platform that allows the development of cross-device, cross-application composite solutions.

Real-Time Messaging System

Event and messaging services in the EEM platform environment are provided by the Real-Time Messaging Service (RTMS) 220. The RTMS 220 provides applications with guaranteed delivery for messages as well as event publishing and subscription services. In a preferred embodiment, the RTMS 220 provides the applications with an ability that allows them to communicate with each other via XML messages without having to worry about the intermediate transports. Various different secure transports are provided by the security system 270.

The RTMS 220 is constructed directly on top of the UDBD 210, allowing EEM platform applications to communicate with each other via the UDBD 210 abstraction. When an EEM platform application wishes to receive event notifications about a specific resource, the EEM platform application finds the UDBD location that correlates to that particular resource and subscribes to events from that location. As a corollary, when an event on that resource occurs, an application will publish a RTMS event on that same location. The RTMS 220 will then take care of delivery the event to all the subscribers.

With the aid of the presence management system 260, the RTMS 220 has been constructed to be intelligent in terms of message delivery. If a destination device is offline (as detected by the presence management system 260), the message will automatically be queued. Message routing is designed to be dynamic and intelligent, with the RTMS 220 determining, in real-time and on a per-message basis, the device that best represents a resource. This run-time device determination allows the delivery device for a particular resource (whether it be a person or application) to be changed dynamically and in real time. If an EEM platform user is carrying a PalmOS based handheld computer system one day and a Research In Motion (RIM) Blackberry device the next day, all that has to be done is notify the RTMS 220 of the change. Once this is done, messages destined for that user will be sent to the RIM Blackberry device without having to change anything in the applications themselves.

Determining the physical delivery device at delivery time is especially powerful when coupled with the notion that not all resources in the UDBD 210 have to be real resources. Locations can instead represent abstract virtual 'roles' within the system. The physical entity that is playing a given role can change at any time, or a role could be played by several physical entities. Arranging resources in this way allows the EEM platform to dynamically adjust, in real-time, to respond to the changing enterprise environment.

Rules Engine

In conjunction with the Real-Time Messaging Service (RTMS) 220, the present invention provides a Rules Engine 240. The rules engine 240 allows the administrator to have complete control over the EEM platform by processing every event message with a set of administrator-defined rules. The rules engine can determine how event messages are routed, what applications should to be activated, and number of other reactions in response to an event message. If a desired reaction to a particular event message is too complicated to create with the rules engine 240, then the rules engine 240 can be used to direct that event message to an external event aware application.

In order to route messages to various resources in the enterprise, the rules engine 240 relies upon the Universal Database Directory (UDBD) 210. Specifically, the UDBD 210 provides a comprehensive directory of all the available computing resources and the means in which the computing resources may be accessed.

Presence Management System

Using the Presence Service, EEM platform applications can query in real time for the presence of computing resources within the enterprise. The presence of computing resources is automatically maintained by the RTMS 220 based on availability of end-devices, and this is all abstracted from the application designers. In conjunction with the EEM platform virtual resource and roles system, presence maintenance becomes a very powerful concept. Applications are able to query the presence of abstract resources within the system without having to worry about which exact entities are playing which exact roles at the moment.

The EEM presence system 260 allows for a new class of intelligent applications that utilize the availability status of various resources to more efficiently achieve their goals. This is especially powerful since various levels of presence are in fact supported, i.e. a resource might be present at a device level but not present at an application level. Granular control of the presence status of individual resources allows their status within platform to be carefully customized by solution designers.

Security System

The EEM platform has been designed to be extremely easy to integrate into an existing enterprise environment, both in terms of its core technology and in terms of its security model. By default, all EEM platform services and technologies run from behind the corporate firewall on machines in a secure data center. While the EEM platform ideally has a few ports open in the firewall to allow client applications to connect to the EEM platform, the EEM platform does natively support SSL connections to clients, allowing applications to use secure connections into the backend services. If it is not possible to open ports on the firewall, the EEM platform requests can also be sent over HTTPS (a secure version of the well-known HTTP protocol).

The EEM platform is intended to directly interface with the corporate security environment. For example, it is possible to drop the EEM platform into an enterprise that uses Kerberos and have all the EEM platform applications and services use Kerberos tickets for authentication purposes. However, the EEM platform can use almost any scheme for authentication.

Internally EEM platform applications are written to use the authentication systems of the EEM Security System 270. The EEM Security System 270 provides an abstracted layer of encryption and authentication interfaces which can be modified from deployment to deployment. Once a user is authenticated to the EEM Security System 270, the EEM Security System 270 will take care of taking whatever steps are necessary to authenticate the user to the enterprise environment. If user input is needed to do so (a passphrase or a SecurId for example), then the EEM Security System 270 will use the RTMS 220 to acquire the required information. By using the EEM Security System 270, EEM applications can ensure that very little word need be done to deploy EEM enabled applications in various enterprise environments.

The EEM platform also has separate security and access control list (acl) protection built into the RTMS 220 and UDBD 210. The EEM platform protects the UDBD 210 from unauthorized reads as well as writes and the RTMS 220 has inhibitors to prevent users sending undesired messages to other locations in the enterprise. When applications are installed onto the EEM platform, the Administrator will grant the appropriate permissions to the application to allow it to perform its work. By granting only limited permissions, the system will be protected from damaging actions performed by malicious or faulty applications.

Groups Engine

The Groups Engine 250 of the EEM platform enables workflow and workgroup applications by joining related enterprise resources together. Using a group, a node in the UDBD 210 tree can conceptually represent more than one resource. For example, a group might be a team of users within a corporation or a cluster of distributed data. The notion of a group is one that is built into the EEM platform, however it is up to applications to determine how to logically handle the flow of data for groups. Such applications are known as group-aware applications. These group-aware applications incorporate groups and group members into their logic. For example, a group-aware email server would take any email that is addressed to a group and make sure that each individual member of the group is delivered the message.

The Groups Engine 250 is a resident application that enables groups to seamlessly incorporate the events produced by its members. When a new member is added to a group, the Groups Engine 250 automatically subscribes to all events produced by that member. Whenever an event is generated on that member, the Groups Engine 250 will automatically send the event to all other group members. In this way, the group becomes the sum of the contributions of its members. This abstraction allows applications to treat the group as an entity in its own right. For example, a workflow monitoring application could keep track of different parts of a company in terms of groups and still get feedback about all work as it progresses. Without the Groups Engine 250, modeling data flow among and between corporate workgroups would require many more individual subscriptions and a great deal of micro-management.

EEM Application Programming Interface (API)

The EEM platform provides an EEM applications programming interface (API) 230 that provides a development environment that is programming language-independent and platform independent. Communication with the RTMS 220 and other EEM platform services is done via an XML-based Application programming Interface (API) 230 using TCP/IP or HTTP. The XML-based API 230 provides application developers with a web services interface that supports open standards such as XML-RPC, SOAP, UDDI, WSDL, and J2EE.

This open API allows programmers to choose whichever development language they want. Since there is no required development or deployment environment, EEM platform applications can be created for any computing platform or device. Thus, the EEM platform's interface allows developers to use their favorite development environment such as Visual .NET, JBuilder, IBM's development toolkit, or others to build real-time collaborative applications. Because the component applications of an EEM solution have such flexibility in their development and deployment, EEM platform solutions are effectively "future proof".

The EEM platform allows developers to create a set of event-driven applications that are referred to as 'web services'. The developed web services operate on enterprise data provided by EEM-enabled applications. These web services all operate upon the shared directory-based data store known as the UDBD 210. In addition, the web services use the RTMS 220 when they need to send or receive data from client EEM applications.

Figure 3A:
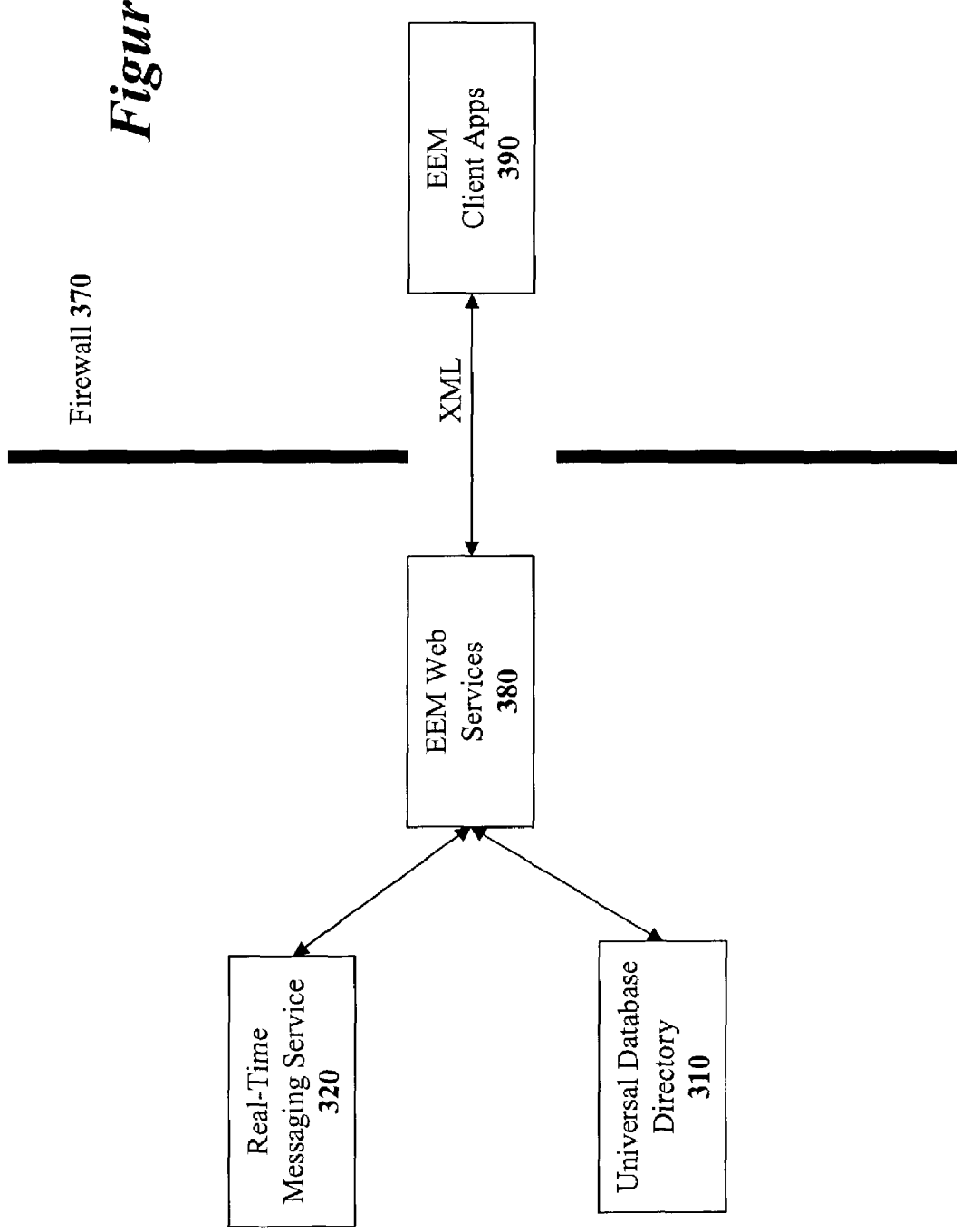
FIG. 3A illustrates the enterprise event management (EEM) system implemented on the Internet.

Referring to FIG. 3A, the UDBD server 310, RTMS server 320, and EEM web services 380 typically reside in a secure location on-site behind a firewall 370. The EEM applications and EEM clients 390 themselves can, of course, operate externally.

The EEM platform provides its functionality via always-on, always-available XML-based web services 380 that are accessible across the Internet. Whether applications access this functionality through HTTP or TCP/IP or any other transport, the goal of the EEM platform is to allow applications to push rules, intelligent message routing and message delivery to the platform level. Sophisticated solutions can be developed that contain complex logic at the EEM platform level and only simple application logic at the device level. This is ideal for mobile devices, since current mobile systems typically do not have the computing power necessary to do complex real-time processing.

The EEM platform is designed to easily integrate with past, current and future enterprise data sources. From the perspective of the platform all data sources, whether they be users, applications or data stores, are treated in a similar fashion. They are each given a location in the UDBD 210 tree on which they can publish events and from which they can retrieve their messages. The message and delivery services are replaceable components of the EEM platform designed to allow XML to be transmitted to and from any device or application. Customizing these services will suffice to allow simple XML communication between a data source and the EEM platform.

Oftentimes, the EEM platform will be responsible for integrating with a legacy data source and extracting the event data needed by other applications. When integrating with a legacy data source, an intelligent EEM connector is written for the data source. This connector is typically fairly simple and is charged with querying the data source for required information and relaying that information to the platform in the form of EEM events and messages. It is also responsible for receiving EEM messages destined for the legacy source and translating it into a form that it can understand. For all intents and purposes, EEM connectors can be considered to be proxies for the data source that they represent.

EEM Transport Services

Typically the EEM runtime services are made accessible to client applications via client-instantiated TCP/IP connections to web services. To support clients that reside outside of the protected network, this does make it necessary for certain ports to be opened up through the corporate firewall 370. If this is not possible, or if additional transport protocols are desired, the EEM platform also supports multiple different transport mechanisms using plug-in transport modules.

The details of how each secure transport is implemented are fully contained within the individual plug-in secure transport module. By abstracting secure transport into the EEM platform layer, EEM applications can be made to communicate with a variety of different client devices and systems with no modification of web services application-side code.

Figure 3B:
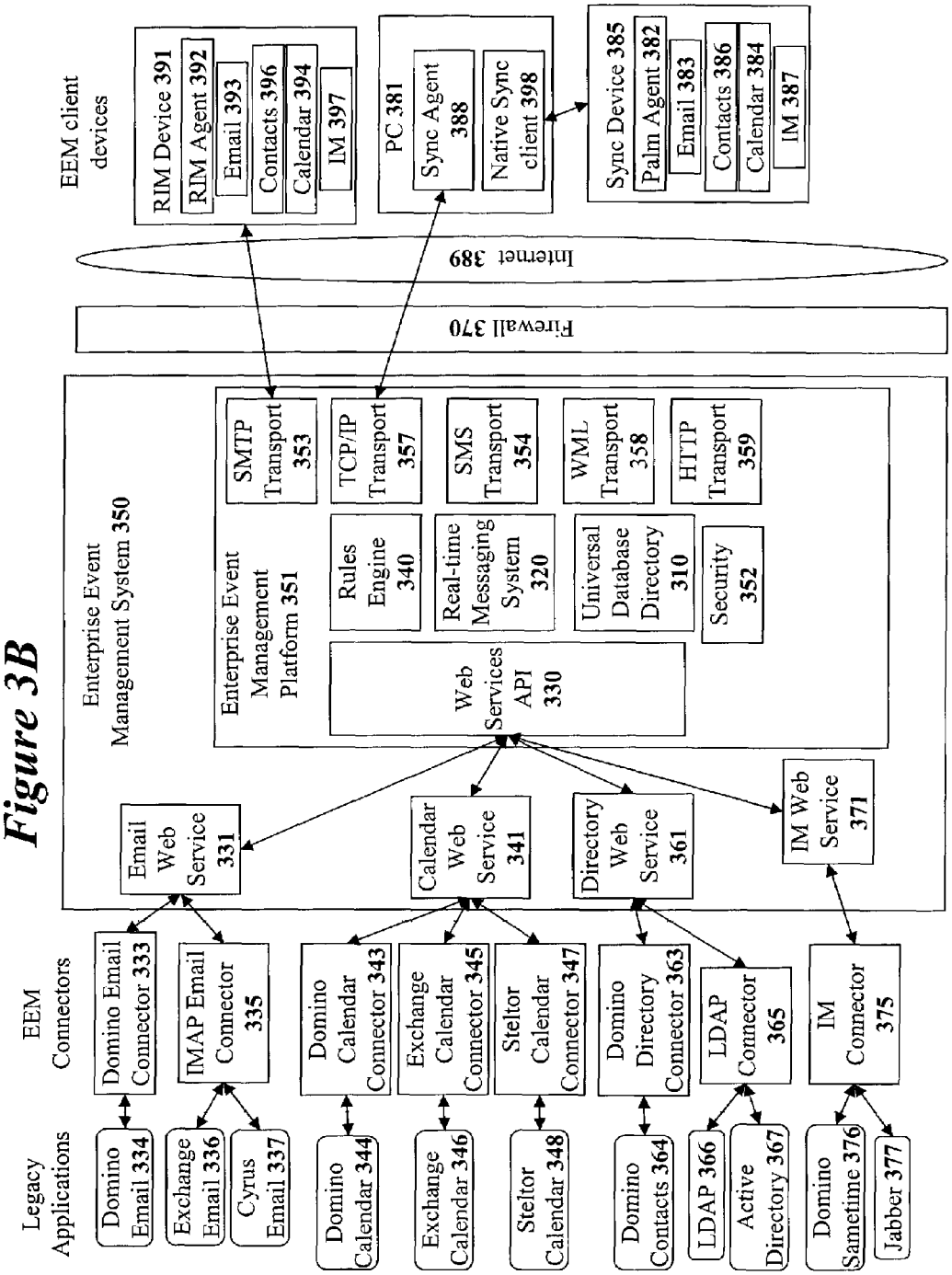
FIG. 3B illustrates an enterprise event management (EEM) system used to implement a set of Personal Information Management (PIM) applications as web services application.

As illustrated in FIG. 3B, the EEM platform has several different built-in secure transport mechanisms for interfacing with various different computing resources. The EEM platform will automatically select the best secure transport system that is supported by a particular computing resource (such as a mobile client device). Support for different secure transport mechanisms including SMS (Small Message Service), SMTP (Simple Mail Transport Protocol), and TCP/IP (Transmission Control Protocol/Internet Protocol) are built into the EEM platform in the form of plug-in secure transport modules. By using plug-in modules, it is simple to add, modify and remove the secure transport modules. A number of the plug-in transport modules will be discussed with reference to FIG. 3B that illustrates SMTP transport 353, TCP/IP transport 357, SMS transport 354, WML transport 358, and HTTP Transport 359.

As previously set forth, it is possible to access the EEM platform functionality as web services through the HTTP protocol using HTTP transport module 359. The EEM platform provides a messaging interface connector that installs onto any J2EE compliant application server and utilizes the server HTTP listener to provide EEM web services. The connector can be leveraged if browser-based access is required, for security purposes or for any other situation where HTTP is the protocol of choice. Once the connector is installed on the J2EE server, EEM services can also be reached via the EEM Real-Time Messaging System 320. In the case that the EEM platform has been deployed via a J2EE application server, the EEM platform can use the Java Connector Architecture to communicate with any compatible Enterprise Information System.

To support various markup languages, such as HTML and WML (Wireless Markup Language), the EEM platform provides an XSL-based style-sheet engine that supports such browser-based solutions. When a request comes into the EEM platform from a browser, style-sheets are applied to convert the request from its native markup form to internal EEM platform XML based event messages. These XML-based event messages are then issued to EEM platform web services applications. The results from the web services application are reassembled, sent through another style-sheet, and transmitted back to the browser. Using this system, Web (HTML) and WAP (WML) front-ends can be quickly generated on top of existing solutions by writing only style-sheets and high-level scripts. Thus, Web (HTML) and WAP (WML) browsers can be supported by the EEM platform. As no EEM agent is installed on the WAP devices, security is limited to whatever the native browser supports.

To support more advanced client devices that have access to HTTP, the EEM provides a HTTP transport module 359. The HTTP transport module 359 differs from HTML transport in that a device that uses HTTP transport 359 has a full client device agent. Devices such as the Palm i705, the RIM 5810 devices, and the Handspring Treo can be supported with a client device agent that uses the HTTP transport module 359 for communication between the mobile client device and the EEM platform. The communication mechanism for this solution requires an EEM application residing on a J2EE compliant application server to exchange information with the mobile client device. The application server must be Internet accessible to enable routing of messages between the application server and the mobile client devices. As with other EEM transport modules, all information within the HTTP packets sent and received by the mobile client device contain encrypted and compressed XML event messages.

As new generations of mobile client devices and new wireless networks are introduced, developers will implement new communication systems for these new devices and networks. If the new networks use standard mechanisms (such as TCP/IP) then the EEM platform will already have native support in the platform layer. Otherwise, a new custom plug-in transport module can be written to allow the EEM applications to reach the new client device over the new network.

For client devices that have extremely limited networking capabilities (such as RIM Blackberry devices) email is sometimes the only accessible transport to the Internet. To help enable these systems, the EEM platform fully supports session-based communication with XML over SMTP email transport with the SMTP transport module 353. Applications on these devices can send and receive EEM events via the RTMS 320 system just like any TCP/IP enabled device would be able to. The EEM SMTP transport module 353 typically will not interfere with the flow of regular email to and from a client device.

Note that the EEM platform does not provide any external transport services. For example, the secure SMS transport plug-in module will allow secure XML based communication over SMS but does not provide an SMS gateway. Similarly, the SMTP transport allows XML based communication with devices through e-mail, but does not provide an SMTP gateway. Instead, these plug-in modules leverage the existing infrastructure of the enterprise. When installing the EEM platform, the resources of the target enterprise are assessed, and appropriate secure plug-in transport modules are installed to allow EEM applications to take full advantage of them.

The TCP/IP transport 357 can be used to support mobile client devices that only support cradle-based synchronization for communication. Cradle-based synchronization enables PalmOS and WindowsCE devices to access email and PIM resources on the corporate network communication. With cradle-synchronized devices such as sync device 385, the user will place their mobile client device 385 in a cradle connected to their personal computer 381 that is connected to the local corporate network via direct network access or VPN. An EEM aware synchronization agent 381 resides on the personal computer 381 and provides a secure encrypted connection to the EEM platform through the TCP/IP transport 357 for the cradled device. As with all other EEM transport systems, the information exchanged between the client device and the EEM platform across the TCP/IP transport 357 will be encrypted at the originating point then decrypted upon receipt by the receiving point.

The EEM aware synchronization agent 381 is not directly associated with a specific cradle-based mobile client device. In this manner, a user is able to place their cradle-based mobile client device in any EEM-enabled cradle and synchronize the latest modifications to their email and PIM information with their corporate server.

Note that a specific mobile client device may be accessible through more than one network using one of several transport different protocols. The EEM platform is designed to resolve these issues dynamically at run-time. Once a particular client device registers its presence within the EEM platform all messages are sent to that mobile client device using the optimal transport protocol available (wired or wireless).

An Example Set of Applications

Personal Information Management

In today's fast-paced working environment, employees are becoming increasingly mobile. At the same time, more and more information is being placed at their disposal to aid them in maximizing their productivity. These two factors are making it considerably harder to give the employee's the tools they need to manage their personal information. Even when mobile Personal Information Management (PIM) tools are available, they do not always present consistent views of the available data nor do they always act in an intelligent, co-operative fashion.

The EEM platform of the present invention can be used to implement an integrated PIM solution for an enterprise. The PIM solution allows a message to be delivered to any user at any time. The sender of the message does not necessarily have to be another user, the sender could instead be an automated application or a rule. When an instant message is received on a device, the message must be displayed to the user. The method of delivery of the message could be anything, email, SMS, XML or various proprietary protocols.

The PIM solution keeps track of information related to other people who may or may not be in the EEM platform system. Contacts applications are especially useful when they are pervasive—that is the same contacts data can be accessed and updated anywhere, anytime. The PIM solution further allows users to make and view their appointments and schedules. It warns of conflicts and alerts the user when it is coming close to a given event. It also allows users to coordinate in order to find mutually agreeable times to hold joint events.

Using the EEM platform as a tool, it is relatively easy to develop a powerful PIM suite that will meet all the requirements described above. FIG. 3B illustrates one embodiment of an enterprise PIM solution implemented with the EEM platform of the present invention. The overall PIM-solution is made up of a set of individual PIM applications that are in charge of providing functionality in their own specific areas. Specifically, FIG. 3B illustrates an email web service application 331, a calendar web service application 341, a directory web service application 361, and an instant messaging (IM) web service application 371. Each individual PIM web service application will be discussed individually below.

Email Web Service

One of the most fundamental information applications available today is simple email messaging. Email allows people to communicate detailed information in an asynchronous manner. So important is email that Research In Motion has built a successful business based primarily upon mobile email access with their Blackberry line of products. The EEM platform of the present invention can transform an enterprise email system into an event-driven email system that can be securely adapted to any new network or mobile device that subsequently becomes available.

Referring to FIG. 3B, the email web service application 331 interfaces with the EEM platform 351 through the Web Services Application Programming Interface (API) 330. To communicate with the enterprise's existing email infrastructure, one or more email connectors are used.

In the embodiment of FIG. 3B, a special Domino email connector 333 is used to integrate the email web service application 331 to a Domino email server 334. As previously set forth, the EEM platform provides a modular approach to authentication services and supports most standard authentication mechanisms required by corporate applications. For Lotus Domino support, there are two application components that comprise the EEM system solution: the main EEM platform 351 and the Domino connector 333. To access the Domino server from mobile client device, they user must first use the mobile client device agent application to authenticate themselves to Domino with their native Notes ID and password. The device agent packages the authentication information using a locally stored key, and then transmits the encrypted (3DES, Blowfish, AES) message through the transport service available to the mobile device. The authentication message is then received by the EEM platform 351 and decrypted using a local key stored for that user. The EEM platform 351 then uses the Notes ID and password on behalf of the user to authenticate itself before enabling the flow of information between the user's account and their device. The EEM platform 351 holds the user's password in memory until the EEM platform 351 expires their authentication. The period that the user's authentication is valid is configurable by the EEM platform administrator. The Domino connector 333 is based on Note's API's and runs as a Notes server task. The Domino connector 333 delivers user's events to the EEM system provided the user's authentication information is valid When possible, it is desirable to implement connectors using well known standards. In FIG. 3B, the email web service application 331 is integrated to a Microsoft Exchange Email Server 336 and a Cyrus Email server 337 using an IMAP Email Connector 335 that uses the well-known standard IMAP email protocol. Newer IMAP servers that support an event-driven model using an 'IDLE' command can be interfaced with an event-drive connector. However, older IMAP implementations are periodically polled.

Once the existing enterprise email systems have been integrated into the EEM platform, the information in those email systems become part of the overall event-driven EEM system. Email messages can trigger rules, routed to multiple destinations, forwarded to a designated agent, etc.

Contacts Web Service

Personal contact information such as sales contacts, vendors, and potential customers are vital information to any enterprise. However, most existing systems do not allow user's to easily share contact information. The EEM platform can be used to implement an enterprise-wide directory system that allows any user to easily share their contacts with any other user. FIG. 3B illustrates a directory web services application 361 that integrates all the different contacts and directory systems of an enterprise. In such a shared system, if user A wants to share a contact-book with user B, then all that is required is that user A set the permissions of user B to allow user B to view the contact-book. From that point on onwards, that contact-book could be 'imported' as one of user B's contact-books. Thus, updates made by user A to the contact-book would automatically be seen by user B. User B could also set alerts on the contact-book, so that whenever user A updated it, then user B would be notified by email, SMS, or an Instant Message.

In the PIM solution of FIG. 3B, the directory web services application 361 is coupled to a Domino contacts server 364 through a Domino directory connector 363. The Domino directory connector 363 could be a Notes server task as set forth with the Domino Email connector 333. Directory web services application 361 is as coupled to a couple of Lightweight Directory Access Protocol (LDAP) directories (LDAP server 366 and Active Directory 367) through an LDAP connector 365.

The EEM platform directory web services application 361 may heavily leverage the UDBD 310 as a data source. Since access to the UDBD 310 is available via TCP/IP or HTTP web services, it makes sense to store contact information in the UDBD 310 as it then becomes pervasive. In addition, the directory structure of the UDBD 310 is a good tool with which to model contact-books as well as individual contacts. Most of the logic of the directory web services application 361 is written as an always-running web service similar to the EEM platform core services. Individual contacts applications written for individual devices would connect to the directory web services application 361 and use XML messages to add, delete and view contacts. Because the XML interface of the directory web services application 361 is standardized, the same instructions would be issued no matter which device is running the contacts client.

Calendar Web Service

The EEM platform Calendar web services application 341 can be implemented in a similar fashion to the directory web services application 361, as it shares many of the same features. The central data repository may also be the UDBD 310, with all of the EEM platform specific Calendar information stored there.

Calendar connectors have been developed for the various popular Calendaring backend systems. Specifically, FIG. 3B illustrates a Domino calendar connector 343 connecting to a Domino Calendar server 344, an Exchange calendar connector 345 connecting to an Exchange Calendar server 346, and a Steltor calendar connector 347 connecting to a Steltor Calendar server 348. In one embodiment, the EEM platform calendaring web services application could be a wrapper for one of the above calendaring systems, with no calendar logic of its own.

In an environment with a calendar web service application, the EEM platform calendar clients on devices would connect to the calendar web service and issue a request. That request will be issued to the appropriate backend, such as the Steltor calendar 348, via the RTMS 320 and the Steltor calendar connector 347. Once the Steltor calendar 348 responds, the RTMS 320 will transport that reply back to the requesting client. In this way, an enterprise can leverage its existing Calendar software investments.

One advantage to using EEM platform is that it can help unify the client view of the Calendar state when multiple systems are in use as in the system of FIG. 3B where three different calendar systems are in use. If some people use Exchange for their calendar while others use Steltor, the single Calendar web services application 341 serves both sets of people. Only the EEM platform configuration need be changed to route their requests appropriately.

Using the UDBD 310 to implement the same sharing model as described in the Contacts section, the Calendar web services application 341 can provide group scheduling logic. While an individual user's schedule will be made up of both shared (group) and personal appointments, all of this is made transparent to anything other than the UDBD 310. Users will be able to seamlessly create, share, and modify both their own individual commitments as well as those of their teams and groups. To further accelerate the process of establishing multiple-person commitment, the EEM platform alerts, rules and event systems can be leveraged to alert users in real-time whenever their schedules are adjusted by another user.

Instant Messaging Web Service

Instant Messaging (IM) is an application that is easy to implement using the EEM platform since user based messaging is just a subset of the messaging functionality provided by the EEM platform. FIG. 3B illustrates an instant messaging (IM) web services application 371.

In one embodiment, the IM web services application 371 could just be a customized thin wrapper for the RTMS 320. When a message is sent from user A to user B, the IM web services application 371 would just use the RTMS 320 to transmit a message from user A's UDBD location to user B's UDBD location. If user B is online, the RTMS 320 will automatically deliver the instant message regardless of which device user B is using. This device could be a personal computer, a Palm Pilot, an iPAQ handheld, a laptop computer, a RIM Blackberry, or any other client system integrated into the EEM platform. Depending on which client device it is, the instant message might be delivered in via different messaging protocols. For example on a Palm Pilot, a specially written IM client would pick up and display the message. On the RIM Blackberry, the instant message could be sent as an email using the SMTP transport 353. On a WAP phone, the message would come in as SMS message. The determination of the delivery protocol is handled by the EEM platform 351 without the IM application itself having to concern itself.

While the intelligent routing of the RTMS 320 makes a compelling IM client, this is not the only feature of the RTMS 320 that makes it useful for implementing an IM system. The EEM platform also provides a way for clients to send messages that require responses. The IM web services application 371 could therefore send an instant message to a user that asks the user to select from a list of responses and reply to the sender. In conjunction with the native group support provided by the EEM platform, the IM web services application 371 could quickly become a very powerful way of quickly polling teams of users for information and receiving real-time replies.

EEM PIM Solution Advantages

Once the core PIM applications (email web service application 331, calendar web service application 341, directory web service application 361, and IM web service application 371) are deployed, they can now be used as building blocks to extend the overall EEM platform PIM solution. Possible collaboration scenarios between these applications include: Calendaring and Instant Messaging; and Calendaring and Contacts and the EEM platform Role System.

By leveraging the functionality of these two services, a more powerful, flexible solution emerges. For example, when User A wants to schedule a meeting with User B then User A can schedule a tentative meeting on her side then send an Instant Message to User B. That instant message will be delivered by the RTMS 320 and will be routed to User B's client device. If that client device happens to have User B's calendar application running, it can intercept the instant message, determine if User B is able to attend, and automatic reply. If the appointment was accepted, the device will alert user B that he has a new appointment. When the reply instant message is received at User A's device, she will be notified that the appointment was accepted.

If the calendaring instant message is received on User B's client device and there is no calendar software running, the instant message will be displayed by the IM client on the client device. User B will see the instant message indicating that there is a request for an appointment at a certain time and be asked whether he wishes to accept or refuse. User B can make a selection, then send an IM back to User A confirming/denying the appointment. At the same time, the IM client will send an XML event message back to User B's Calendar server back at the home office, which will commit the appointment on his side.

By combining these applications, a complicated real-time solution can be built that better adjusts to the changing enterprise environment. Say that User A wants to meet with the trader who will be working on a given account on a given day. User A would use the EEM platform calendaring client, but rather than have to look up who that trader actually is, User A can instead schedule her appointment with the EEM platform virtual role of the trader. User A now has an appointment, not with a particular person, but with a virtual EEM platform user. At this time, the calendar web service application 341 would also dynamically query the contacts database to find out who the trader is currently and display their name and contact information in case User A needs it. It would also co-ordinate with that person's contact application to reserve the appointment time.

Because the appointment made by User A is not against a particular person but instead with a role, that information never has to be hard-wired to that commitment. Instead, if the trader ever changes (for example if the account is handed off, or that salesperson calls in sick) then the role of the trader will be played by another user in the EEM platform. An event will be generated, and with no intervention by User A, her calendar will automatically update itself to display the new trader's contact information. It will also use the RTMS 320 to automatically contact that person's calendar to make an appointment with them. If desired, User A could set up an alert rule to notify her if this occurs, or she can merely let it happen transparently. Overall though, the combination of contacts, roles and calendaring allows for a much more flexible, dynamic overall solution.

The Mobile Client Device

A key feature of the EEM platform is that once enterprise PIM applications have been abstracted into event-driven web services (as done with email web service application 331, calendar web service application 341, directory web service application 361, and IM web service application 371), those web services can be easily made available to mobile client devices such as client device 391 in FIG. 3B. The mobile client device may include a dedicated set of client applications for easily interacting with the PIM web services. For example, client device 391 includes an email client 393, a calendar client 394, a contacts client 396, and an IM client 397 for interacting with email web service application 331, calendar web service application 341, directory web service application 361, and IM web service application 371, respectively. Various different client devices can use various different secure transport mechanisms. Mobile client device 391 uses the secure SMTP transport mechanism 353.

Figure 4:
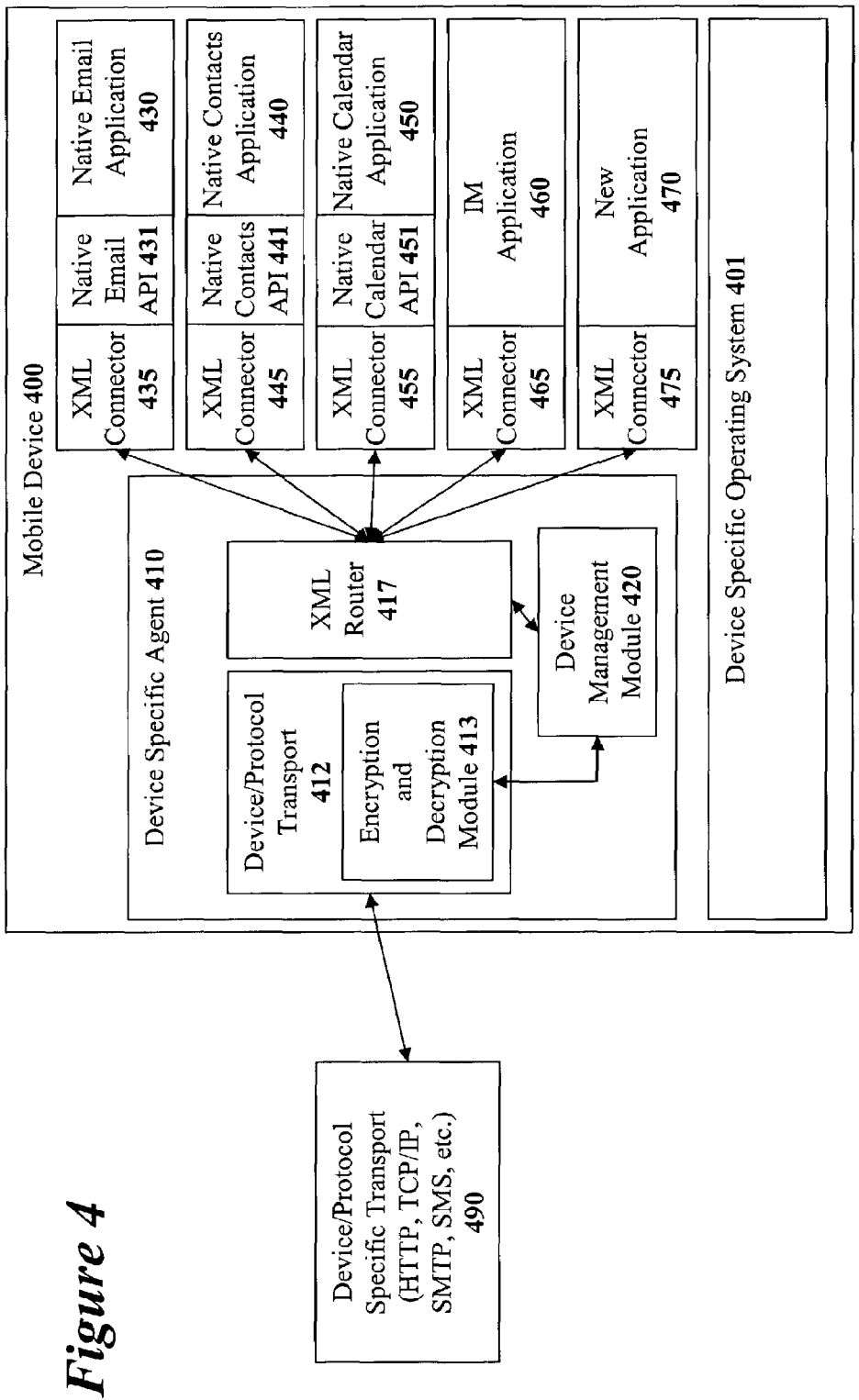
FIG. 4 illustrates a detailed implementation of a mobile client agent and a set of Personal Information Management (PIM) client applications for use with the PIM Web services of FIG. 3B.

FIG. 4 illustrates a detailed view of a mobile client device 400 that has been integrated into the EEM platform of the present invention with a full device specific agent 410. The device specific agent 410 is a program that handles the EEM communication for the mobile client device 400. The device specific agent 410 is responsible for acting on both incoming and outgoing XML event messages. The device specific agent 410 runs on the native Device Operating System 401 on the mobile client device 400.

The device specific agent 410 communicates with one of the device or protocol specific transport systems of the EEM system. Specifically, a device/protocol transport module 412 in the device specific agent 410 communicates with a matching device/protocol specific transport mechanism 490 in the EEM system. The device/protocol transport module 412 includes an encryption and decryption module 413 for maintaining a secure connection across the transport means. The device/protocol transport module 412 is responsible for providing a reliable transport means for exchanging XML event messages with the EEM platform.

After the device/protocol transport module 412 has received a decrypted an XML event message, the device/protocol transport module 412 passes the XML event message to an XML Router 417. The XML Router 417 is responsible for routing the message to an appropriate receipt application. In the mobile device 400 of FIG. 4, there are five different XML connectors (435, 445, 455, 465, and 475) for receiving XML messages from the XML Router 417.

The device specific agent 410 itself may be a recipient of XML messages. Specifically, the device specific agent 410 includes a device management module 420 for managing the mobile device 400. The XML Router 417 routes special device control XML messages to the device management module 420 and the device management module 420 implements the request of those messages.

For example, the EEM administrator may send a device control message to a mobile device instructing it to move to the next set of encryption keys. The device management module 420 would receive such a message and instruct the encryption and decryption module 413 to move to the next set of encryption keys.

If the mobile device were lost, the EEM administrator could send an XML control message that would have the device management module 420 destroy all the client data on the device to prevent an unauthorized finder of the mobile device from accessing confidential information stored on the device. If the device is subsequently retrieved, the administrator can remotely restore the user's information by sending a control message that allows the various client applications to resynchronize with their various corresponding web service applications. For example, the email web service 331 could synchronize with the email application 430.

The device management module 420 can be used to allow the EEM platform administrator to configure a mobile client device. Thus, these management features enable the administrator to remotely reconfigure the device for deployment to another user while the mobile device is in the field. This eliminates any need by the administrator for hands-on access to the device.

Many mobile devices already include good Personal Information Management (PIM) client applications. For example, mobile device 400 includes a native email application 430, a native contacts application 440, and a native calendar application 450. To leverage such native PIM client applications, small XML connector applications may simply added. The XML connector applications receive the XML event messages from the EEM platform and translate those XML messages into commands for the API of the native applications. In FIG. 4, mobile device 400 includes three XML connectors 435, 445, and 455 to communicate with the native email API 431, the native contacts API 441, and the native calendar API 451, respectively. Thus, XML connectors 435, 445, and 455 convert the 430, native contacts application 440, and native calendar application 450, respectively, into client applications for the PIM web services applications.

In mobile device 400, there is no native instant messaging (IM) application. Thus, an instant messaging application 460 has been created with an associated XML connector 465 for communicating with the EEM platform. XML connector 465 may be an integrated part of instant messaging application 460.

Integrating a New Mobile Client Device

Figure 5:
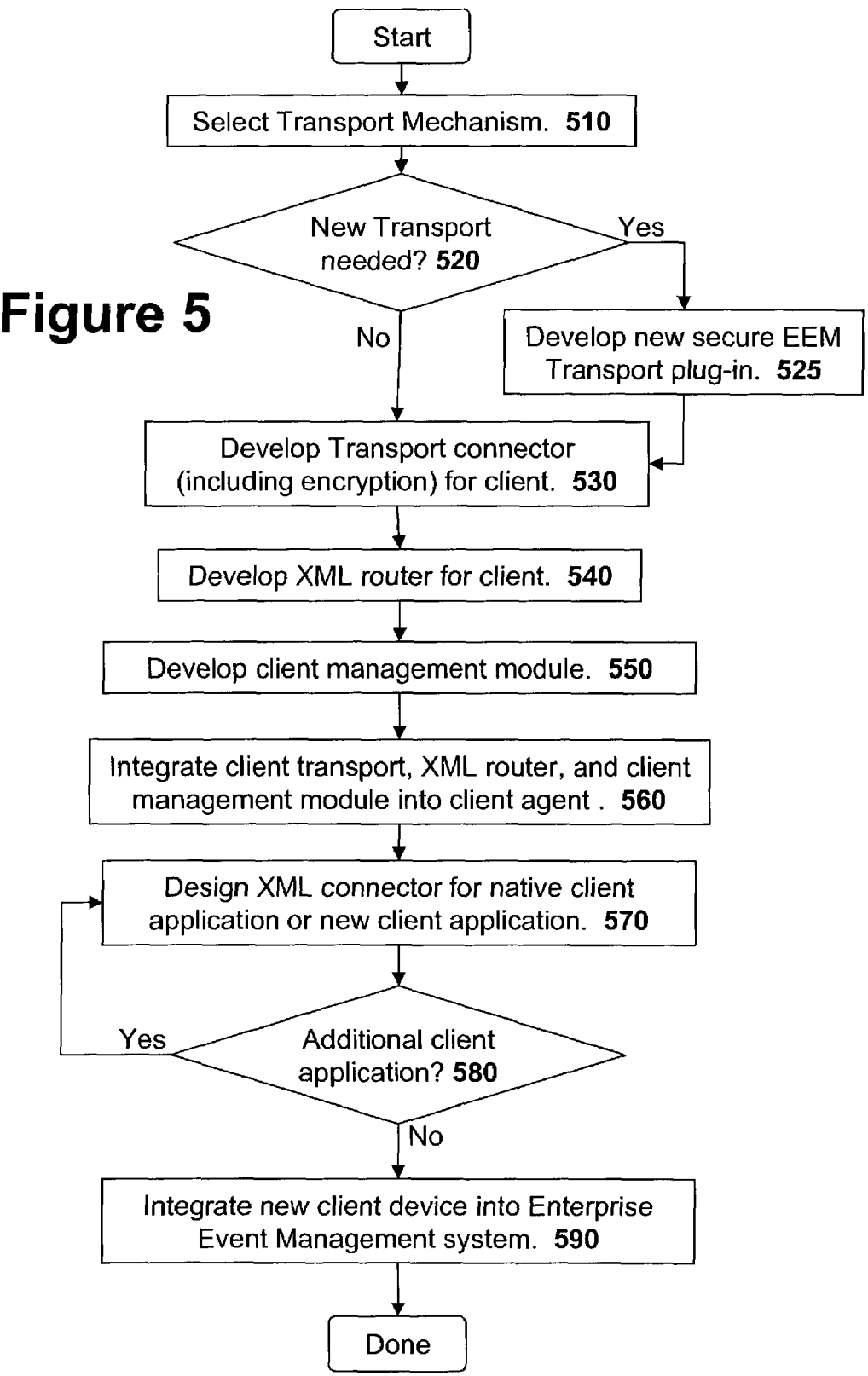
FIG. 5 illustrates a flow diagram that describes how a new mobile client device may be integrated into the EEM platform.

As previously set forth, once the PIM web services have been created, any new mobile device may be added to the EEM platform to support the PIM web services. FIG. 5 illustrates a flow diagram describing how new mobile client device is added to the EEM platform.

First, at step 510, a transport mechanism is selected for the new mobile client device. One of the existing transport mechanisms such as SMTP, SMS, or HTTP may be selected. However, at step 520, a decision is made as to whether a new transport system is needed. If a new transport system is needed, then a new transport plug-in module is developed at step 525 for that new transport mechanism.

Once the transport mechanism has been selected, a transport connector is developed for the new mobile device at step 530. The new transport connector should include encryption and decryption services in order to support a secure transport system.

Next, at step 540, an XML event message router is developed for the new mobile client device. The XML event message router receives XML event messages from the transport connector developed in step 530 and delivers those messages to client applications that run on the new mobile client device. Thus, the XML event message router must be integrated with the inter-process communication systems available from the operating system of the mobile client device.

At step 550, a client management module is developed for the new client device. The client management module must be able to handle the client management messages that are sent from the EEM administrator.

Finally, at step 560, the developer integrates the client transport module from step 530, the XML router from step 540, and client management module from step 550 into a client agent for the mobile device. The client agent becomes the extensible platform that can be used to add individual client applications.

At step 570, a client application is added to the mobile device. A client application may be added by developing an XML connector that integrates an existing native client application into the EEM system or by creating a whole new client application for the mobile device. As set forth in step 580, step 570 is repeated to add all the desired client applications to the mobile device.

After developing all the desired client applications for the new mobile client device, the new mobile client device is ready for use with the EEM platform. Thus, at step 590, the new mobile client device is integrated into the EEM platform. Specifically, a set of rules are created into the rules engine for determining how the EEM platform will use the new mobile client device. For example, the rules engine will be informed as to which transport system should be used when communicating with the new mobile client device.

Email Receiving Example

Figure 6:
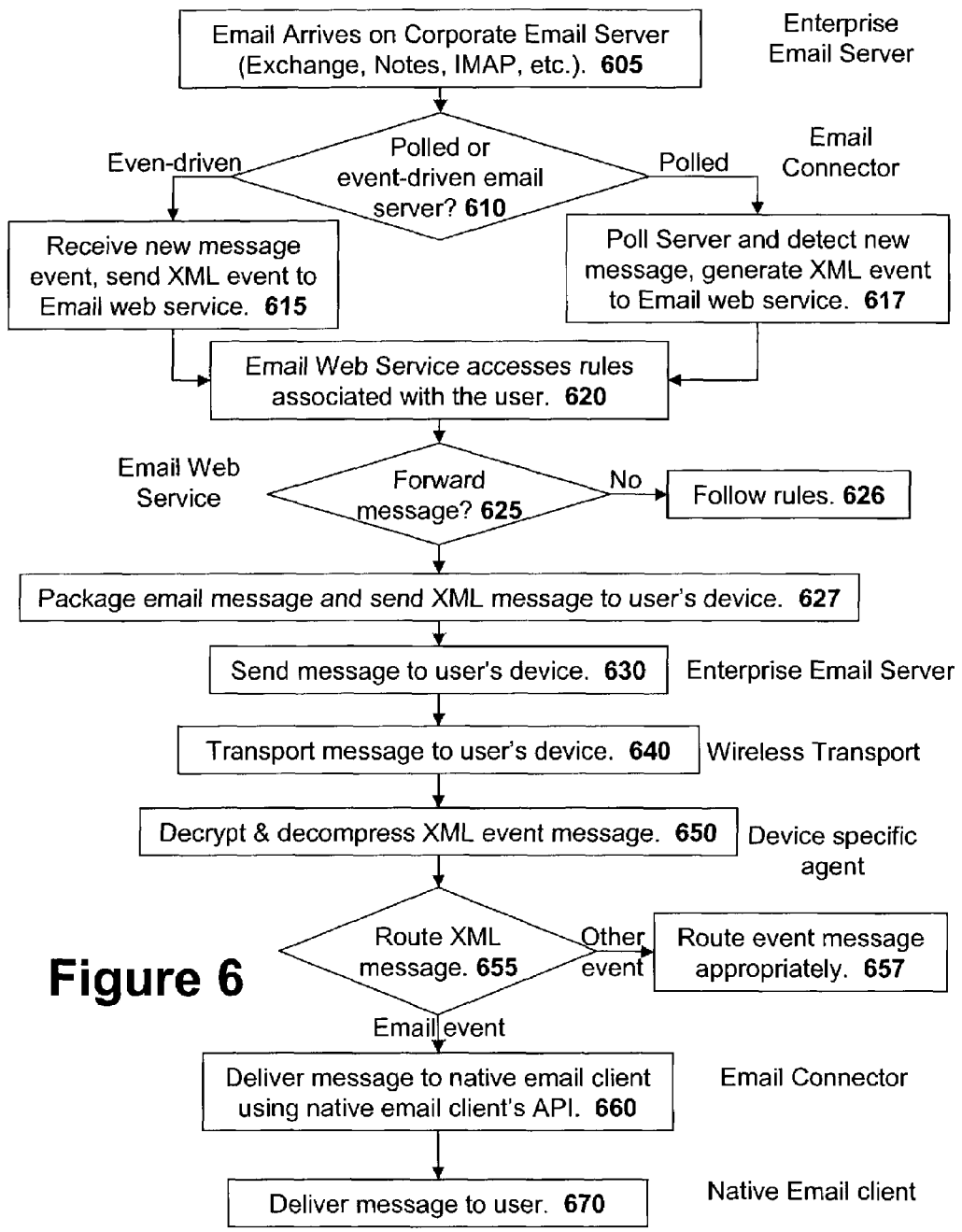
FIG. 6 illustrates a flow diagram that describes how an email message may be routed from an enterprise email system through the email web services application to an EEM mobile client device using the EEM platform.

To fully describe how a mobile client device operates with the EEM platform, a full example of how the EEM platform may forward an enterprise email message to a mobile client device will be provided with reference to FIG. 3B, FIG. 4, and the flow diagram of FIG. 6.

Referring to FIG. 6, an email message is received in an enterprise email server at step 605. This may be the any of the email servers 335, 336, or 337 of FIG. 3B. How the system proceeds next will depend on if the connector the email server is event-driven or polled as set forth in step 610. If the email connector is event-driven, then the connector will immediately learn about the received email message at step 615 and thus send an XML email event message to the email web service application 331 as set forth in step 615. If the email connector is polled, then the connector will eventually poll the email server to learn about the new email message and thus send an XML email event message to the email web service application 331 as set forth in step 617.

Once the email web service application 331 receives the XML email event message, the email web service application 331 consults the rules for that user at step 620. If the rules do not specify that the message should be forwarded, then the email web service application 331 just follows what the rules specify at step 626. If the rules specify that the message should be forwarded to a mobile client, then the email web service application 331 proceeds to step 627 where it packages the email message into an XML event message and sends it to the user's client device.

In the case of a client device such as a RIM Blackberry, the EEM platform automatically packages the XML email event message into an encrypted email message using the SMTP transport 353 of FIG. 3B. The encrypted email message is then emailed to the Blackberry. Thus, assuming the SMTP transport mechanism 353 will be used for this example, the packaged XML email event message is sent to an enterprise email server (335, 336, or 337) at step 630. The enterprise email server emails the message which will then pass through the wireless transport system used by RIM Blackberry devices in step 640. Note that although the message is being broadcast on a wireless network, the contents of the message are secure since the message was encrypted by the EEM system back in step 627.

After being carried by the wireless transport system, the device agent 410 on the mobile client device 400 receives the email message. In a RIM Blackberry device, the device agent 410 intercepts all email messages and handles all XML event messages. If an email message is not an XML event message, then the device agent forwards the standard email message to the email client. At step 650, the transport module 412 of the device agent decrypts and decompresses the XML event message and passes the XML event message to the XML router 417. The XML router 417 then routes the message appropriately at step 655. If the XML event message is not an email event message, the XML router 417 then routes the XML event message appropriately at step 657. But if the event message is an email event message, then the XML router 417 routes the XML event message to the designated XML connector 435 for email event messages.

At step 660, the XML connector 435 for XML email event messages handles the XML email event message appropriately. If the XML connector 435 is working with a native email application, then the XML connector 435 uses the native email application's API 431 to deliver the email message to the native email application 430. This may be performed using standard SMTP or by manipulating the native email applications email storage directly. On current RIM Blackberry models, email messages may be added by directly manipulating the email storage. But in general, it is preferable to use the native client APIs when they are available. For example, on a PocketPC based mobile client device, the XML connector can use an API on the native email clients and calendar clients to "add mail" or "add calendar", respectively.

Thus, the end result of step 660 is that the native email application receives the email message. At step 670, the native email application delivers the email message to the user.

Email Sending Example

Sending email from the mobile device is handled in a similar manner. An example of sending an email message from an EEM enabled mobile client device will be described with reference to FIG. 3B, FIG. 4, and the flow diagram of FIG. 7.

At step 710, a user composes and sends an email message on a native email client application such as native email client 430 in mobile device 400 of FIG. 4. At step 720, the XML connector 435 intercepts the email message and instead formats an XML email event message addressed to the email web service 331 of FIG. 3B. The XML connector 435 forwards the XML email event message to the device specific agent 410 on the mobile device 400.

At step 730, the device specific agent 410 encrypts the XML email event message and sends the encrypted XML email event message to the email web service 331. The device specific agent 410 uses the device/protocol transport module 412 that handles the selected transport mechanism.

In a RIM Blackberry device, the SMTP transport system is used. Thus, the device/protocol transport module 412 emails the encrypted XML email event message in an email message addressed to the email web service 331 using the Blackberry's wireless email system. Thus, in step 740, the wireless transport system carries the encrypted XML email event message to one of the enterprise email servers (335, 336, or 337). At step 750, the enterprise email server that receives the encrypted XML email event message forwards it to the email web service 331.

At step 760, the encrypted XML email event message is received by a redirector in the EEM platform that decrypts and decompresses the XML email event message. Next, at step 765, the email web service 331 reformats the XML event message into a normal email message that is addressed to the intended recipient and from the user of the mobile device. The from-address may be the normal enterprise email address of the user or the mobile email address of the user if the user so desires. The email web service 331 then places a copy of the reformatted email message in the user's sent folder and sends the reformatted (normal) email message at step 767. Thus, the email web service 331 may send the reformatted email message to one of the enterprise email servers (335, 336, or 337).

At step 770, the enterprise email server forwards the reformatted email message to the intended recipient. Thus, the email message sent from the mobile device finally ends in the email server of the intended recipient in step 780.

Adding New Web Services

Many new web services can be added to the enterprise once the EEM has been installed. The types of new web services that may be added are only limited by the imagination of the EEM administrator and developer. FIG. 8 illustrates a flow diagram that describes the steps of implementing a new web service for the EEM platform.

At step 810, the develop designs an interface for the new event-drive web services application. The interface comprises a set of XML formatted event messages that will be sent from and received by the new web services application. Ideally, the developer will define the interface of the new Web Service following any open standards available such as IMAP, ICAL, LDAP, etc. The web service may further be extended to include additional functionality. If the web service will be based upon a legacy application, the developer may wish to provide support for any additional functionality supported by the base legacy application. The web services interface will form an asynchronous, bi-directional event stream between the application and the EEM Platform.

Next, at step 815, the developer determines if the new web service will be based upon an existing legacy application. If not, the developer proceeds to step 850 to develop the web service application. If the new web service will be based up on an existing legacy application, the developer determines if the legacy application publishes events at step 820. If the legacy web services application publishes events, then the developer creates an XML event message based translator at step 830. If the legacy web services application does not publish events, then the developer creates an XML event message based polling agent that will poll the legacy application to determine when events occur at step 840.

Next, the developer develops the web services application at step 850. A whole range of web services applications may be created to perform any desired task that operates on enterprise events. Once the new web services application is complete, the EEM platform administrator deploys the event translator or polling agent (if there is one) and the new web services application at step 860. Then, at step 870, the new web services application is integrated into the existing EEM platform. This step may require changes to the rules engine to allow certain event messages to be delivered to the new web services application.

Finally, if the new web services application is an application that will be used by individual EEM platform users, the developer may design and deploy a corresponding custom client application at step 880. The custom client application may be integrated into EEM enabled mobile devices such as the mobile device 400 of FIG. 4 by adding a new application with an appropriate XML connector.

The foregoing has described an enterprise event management platform that provides secure access to a wide variety of mobile devices. It is contemplated that changes and modifications may be made by one of ordinary skill in the art, to the materials and arrangements of elements of the present invention without departing from the scope of the invention.

We claim:

1. A mobile device comprising:
a device specific agent of the mobile device configured to process event messages specific to the mobile device, forward said event messages to a plurality of applications located on the mobile device, and receive said event messages from the plurality of applications, said device specific agent including
a transport module configured to receive said specific event messages from a network source or a second mobile device originating said specific event messages,
a message router configured to route said received specific event messages within said mobile device; and
a first application from the plurality of applications configured to receive said specific event messages from said message router, wherein when the device specific agent receives said specific event messages originating from the network source or the second mobile device, the device specific agent is configured to verify whether the specific event messages originate from a second application, and whether the second application is included in the plurality of applications on the mobile device by consulting a database directory, and in a case the second application is not included, the device specific agent selects said first application and directs said specific event messages to a module that translates said specific event messages to a format corresponding to the first application.

2. The mobile device as claimed in claim 1, wherein said device specific agent forwards a message not addressed to said device specific agent to a native application.

3. The mobile device as claimed in claim 1, wherein said transport module decrypts incoming specific event messages.

4. The mobile device as claimed in claim 1, wherein said transport module decompresses received specific event messages.

5. The mobile device as claimed in claim 1, further comprising:
a native application connector configured to translate said specific event messages received from said message router into commands for an application programming interface for a native application.

6. The mobile device as claimed in claim 1, wherein said transport module communicates across an SMTP connection.

7. The mobile device as claimed in claim 6, wherein said device specific agent intercepts emails sent to said mobile device.

8. The mobile device as claimed in claim 1, wherein said specific event messages comprise XML formatted messages.

9. The mobile device as claimed in claim 1, further comprising:
a client management module configured to receive client management event messages and change encryption keys.

10. The mobile device as claimed in claim 1, further comprising:
a client management module configured to receive client management event messages and destroy data on said mobile device.

11. An application system that is configured to be in communication with a mobile device, the system comprising:
a real-time messaging system configured to forward to the mobile device event messages specific to the mobile device and originating from a network source or a second mobile device, the mobile device including a device specific agent of the mobile device and configured to process said event messages, forward said event messages to a plurality of applications located on the mobile device, and receive said event messages originating from the plurality of applications;
a rules engine configured to process said specific event messages forwarded by said real-time messaging system;
a universal database directory configured to store information about a plurality of computing resources available to said application platform; and
at least one web services application configured to receive said specific event messages from said real-time messaging system, wherein,
when the application system receives a specific event message originating from a first application located on the network source or the second mobile device, and the application system consults the universal database on a presence of the first application among the plurality of applications on the mobile device, and the universal database directory includes information that the first application is not included in the plurality of applications on the mobile device, the application system translates the specific event message to a format corresponding to a second application and directs the specific event message to the second application.

12. The system as claimed in claim 11, further comprising:
a presence management module configured to determine the presence of client devices.

13. The system as claimed in claim 11, further comprising:
an SMTP transport module configured to deliver said specific event messages in SMTP email messages.

14. The system as claimed in claim 11, further comprising:
an HTTP transport module configured to deliver said specific event messages across an HTTP connection.

15. The system as claimed in claim 11, further comprising:
a legacy application translator configured to translate events generated by a legacy application into said specific event messages for said application platform.

16. The system as claimed in claim 11, further comprising:
a legacy application connector configured to poll a legacy application and generating events for said application platform upon detection of changes.

17. The system as claimed in claim 11, wherein said specific event messages comprise XML formatted messages.

18. The mobile device according to claim 1, wherein the message router further includes:
a rules engine configured to define rules for routing the event specific messages and generate responses to the event specific messages,
wherein the rules are defined based on information of the database directory.

19. The application system according to claim 11, wherein the rules engine is further configured to define rules for routing the event specific messages and generate responses to the event specific messages,
wherein the rules are defined based on information of the universal database directory.

* * * * *